United States Patent
Hinderthür

(10) Patent No.: US 7,764,883 B2
(45) Date of Patent: Jul. 27, 2010

(54) CIRCUIT STRUCTURE FOR A TRANSMISSION NETWORK NODE FOR TRANSMITTING HIGH-BIT, IP-BASED TIME DIVISION-MULTIPLEX SIGNALS, ESPECIALLY FOR A MULTI-GIGABIT ETHERNET

(75) Inventor: Henning Hinderthür, Finning (DE)

(73) Assignee: ADVA AG Optical Networking, Meiningen (DE)

( * ) Notice: Subject to any disclaimer, the term of this patent is extended or adjusted under 35 U.S.C. 154(b) by 396 days.

(21) Appl. No.: 11/762,629

(22) Filed: Jun. 13, 2007

(65) Prior Publication Data

US 2007/0292134 A1 Dec. 20, 2007

(30) Foreign Application Priority Data

Jun. 14, 2006 (DE) .................. 10 2006 027 693

(51) Int. Cl.
*H04J 3/24* (2006.01)
*H04L 12/28* (2006.01)
*H04B 7/212* (2006.01)

(52) U.S. Cl. .................. 398/50; 398/43; 398/47; 398/59; 370/478; 370/498; 370/321

(58) Field of Classification Search .............. 398/43, 398/47, 50, 59; 370/478, 498, 321
See application file for complete search history.

(56) References Cited

U.S. PATENT DOCUMENTS

| | | | |
|---|---|---|---|
| 6,266,341 B1 * | 7/2001 | Surprenant et al. | 370/458 |
| 6,289,025 B1 * | 9/2001 | Pang et al. | 370/458 |
| 6,600,742 B1 | 7/2003 | Hiromori et al. | |
| 7,061,861 B1 | 6/2006 | Mekkittikul et al. | |
| 7,436,849 B1 * | 10/2008 | Amrany et al. | 370/465 |
| 2002/0075868 A1 | 6/2002 | Gupta et al. | |
| 2002/0075869 A1 * | 6/2002 | Shah et al. | 370/389 |
| 2003/0219029 A1 * | 11/2003 | Pickett | 370/442 |
| 2005/0007993 A1 | 1/2005 | Chambers et al. | |
| 2005/0053028 A1 * | 3/2005 | Smith et al. | 370/321 |
| 2005/0099970 A1 * | 5/2005 | Halliday | 370/321 |
| 2005/0220148 A1 * | 10/2005 | DelRegno et al. | 370/498 |
| 2007/0160372 A1 | 7/2007 | Eberlein et al. | |
| 2008/0130689 A1 * | 6/2008 | Kumar et al. | 370/498 |

FOREIGN PATENT DOCUMENTS

| CA | 2 412 276 A1 | 8/1998 |
|---|---|---|
| CA | 2 412 276 A1 | 2/1999 |

* cited by examiner

*Primary Examiner*—Ken N Vanderpuye
*Assistant Examiner*—Danny W Leung
(74) *Attorney, Agent, or Firm*—The Culbertson Group, P.C.; Nathan H. Calvert; Russell D. Culbertson

(57) ABSTRACT

A circuit structure for a transmission network node for transmitting high bit-rate, IP-based time division-multiplexed signals, especially for an optical Multi-Gigabit Ethernet. The structure includes a bidirectional remote ports at two sides, each receiving and transmitting time-division multiplexed signals. Each time division-multiplexed signal has a frame structure with a number of virtual time slots each transporting certain contents. The path-switch unit is constructed to execute switching functions for realizing a drop function, a pass-through function, and a drop-and-continue function. Channel cards and network structures are also provided.

16 Claims, 6 Drawing Sheets

CIRCUIT STRUCTURE FOR A TRANSMISSION NETWORK NODE FOR TRANSMITTING HIGH-BIT, IP-BASED TIME DIVISION-MULTIPLEX SIGNALS, ESPECIALLY FOR A MULTI-GIGABIT ETHERNET

FIELD OF THE INVENTION

The invention relates to a circuit structure for a transmission network node for transmitting high bit-rate, IP-based, time division-multiplexed signals, especially for Multi-Gigabit Ethernet. In addition, the invention relates to a channel card for an optical transmission system and also to a structure of a network node for an optical wavelength division multiplexed transmission network, especially for a Multi-Gigabit Ethernet with such a circuit structure.

BACKGROUND

In recent years, the provision of broadband connections for customers of telecommunications companies has developed into a subject of decisive importance. To achieve maximum utilization from their infrastructure of already existing IP (Internet Protocol) based communications network, service providers are transitioning into offering a plurality of different services, such as conventional Internet access (IP data), Voice over IP (VoIP), Broadcast TV (IPTV), or Video-on-Demand (VoD), which drastically increases the demand for bandwidth placed on the existing infrastructure. This can have the result that the actually available bandwidth is no longer sufficient, and simple, cost-effective solutions must be found for increasing the bandwidth. Here, upgrading or replacing the physical transmission routes, especially cables, satellite transmission routes, and directional radio routes is usually ruled out.

FIG. 1 shows schematically a scenario in which, starting from a head end, a service provider couples broadcast traffic, which can comprise one or more broadcast data streams, and unicast traffic, which can comprise one or more unicast data streams, into a transport network (backhaul), especially an Ethernet, via a Broadband Routing and Access Server (BRAS). In addition to Unicast data generated by the service provider itself, external unicast data streams, e.g., VoIP data streams of subscribers from different networks or IP data streams of other service providers or subscribers from different networks, can also be fed to the BRAS. The unicast data streams generated by the service provider itself can involve, e.g., VoD programs or the like.

At this point it should be mentioned that a data stream does not necessarily have to exist as a separation physical data stream. Several different (logical) data streams can be combined to form a single physical data stream, for example, through packet-multiplexed, time division-multiplexed, or wavelength division-multiplexed techniques, which is then represented by a corresponding signal. A data stream, however, is assigned to a certain source port, where it is coupled into the transport network, which is preferably constructed as a high-speed transmission network. In addition, a unicast data stream is also assigned to a certain target port, where it is decoupled from the transport network. Obviously, each data stream can consist of several or a plurality of sub-data streams, which are similarly each assigned to a target port and/or a source port in the scope of a protocol stack.

FIG. 1 shows a realization, in which a service provider generates at the head end a broadcast data stream, which includes, for example, several TV programs (indicated in FIG. 1 by the box with the satellite antenna), and a unicast data stream for providing a VoD service (indicated in FIG. 1 by the box with the film roll). These data streams are fed from the named data sources to a broadcast server or a VoD server and coupled by these into the transport network via the BRAS. Here, the broadcast and unicast data streams are typically combined into one data stream. This data stream can involve, e.g., a Gigabit Ethernet data stream, in which each frame contains both broadcast data of the broadcast data stream and also unicast data of the unicast data stream.

The data stream transmitted via the transport network is decoupled at a network node KN1, KN2 of the transport network, which corresponds to the target port of the data stream, and is broken down into sub-data streams, which are fed to the subscribers. The splitting of the data stream transmitted via the transport network can be realized, e.g., via a DSLAM (Digital Subscriber Line Access Multiplexer), to which, on the local side, e.g., 500 subscribers can be connected. The selection of the TV program and the splitting of the received signal into the sub-signals for the different end devices and the combining of the sub-signals can be realized on the subscriber side by means of a set-top box (STP).

For increasing the data transmission capacity or the bandwidth of the transport network, it is known to generate at the head end several data streams, which each contain broadcast and unicast data and which combine these through a time division-multiplexing method in the transport network into a single physical data stream between the head end and local loop.

To connect several, usually spatially separated local loop network nodes to the head end using one and the same fiber pair of an optical transport network, the known technology of wavelength division multiplexing is used. Here, one or more dedicated optical wavelengths correspond to a defined local loop network node. The coupling and decoupling of the wavelengths is realized by so-called optical add/drop multiplexers (OADM). For a certain network node, if a correspondingly high bandwidth is needed, then it is obviously also possible to terminate two optical channels, i.e., two wavelengths (more precisely: intermediate wavelengths) in this network node.

This known method is shown in FIG. 2, wherein a time division-multiplexing/demultiplexing unit 1 with two local-side connection ports S1L and S2L is provided for combining the two head end-side data streams shown in the embodiment in FIG. 2. In the schematic representation in FIG. 1, this unit can be arranged in the downstream direction after the BRAS or integrated into this server. The BRAS in FIG. 1 can be constructed so that it generates the two data streams, which each contain the same broadcast data stream B and a unicast data stream U1 or U2. Each of the two data streams is assigned to a certain source port, which corresponds to the connection port S1L or S2L of the time division-multiplexing/demultiplexing unit 1. The time division-multiplexing/ demultiplexing unit 1 combines the two data streams at the connection ports S1L and S2L into a single data stream, which is coupled into the transport network at the remote-side connection port SR via an add/drop multiplexer, which is constructed as an optical add/drop multiplexer (OADM). The sub-data streams combined into one physical data stream are, however, still assigned to the relevant target port.

In this way, each sub-data stream can be decoupled at that network node containing the target port. FIG. 2 shows a situation in which both sub-data streams are assigned to a target port that is assigned to the same network node. Thus, the entire time division-multiplexed signal containing both sub-data streams is decoupled at the same network node and split into the two physical sub-data streams by means of another time division-multiplexing/demultiplexing unit 3, which is connected in turn in series after an OADM with its remote-side connection port PR. The sub-data streams connect, in turn, to the local-side connection port P1L, P2L of the time division-multiplexing/demultiplexing unit 3, to which the target ports of the sub-data streams are also assigned.

As is visible from FIG. 2, the two sub-data streams are combined into a single physical data stream for transmission via the transport network, such that the data transmission rate is essentially doubled and the sub-signals are "interlaced" by a time division-multiplexing method while maintaining their structure, wherein as before each sub-data stream contains all of the information consisting of U1 and B or U2 and B.

For reasons of a simpler representation, the connection ports of the time division-multiplexing/demultiplexing units 1 and 3 are shown as bidirectional ports. Obviously, however, a unidirectional receive port and a unidirectional transport port can also be provided for each bidirectional port.

This known method produces a doubling of the transmission capacity of the transport network. However, twice the bandwidth within the transport network is also required.

The embodiment shown in FIG. 1 involves for the sub-data streams Gigabit Ethernet signals, so that the transport network must be in the position to transmit a time division-multiplexed signal with a data rate of 2 Gbit/s.

Obviously, this known method can also be expanded, wherein at least three sub-data streams are combined into one time division-multiplexed signal to be transmitted via the transport network. This leads, however, to a corresponding multiple increase in the bandwidth requirement with reference to the transport network.

As a solution, it has been proposed, in addition to the use of the time division-multiplexing method, to use a wavelength division-multiplexing method, wherein several time division-multiplexed signals could be transmitted each with a different carrier frequency or carrier wavelength via the transport network using the previously explained means and methods. In particular, for optical transmission via the transport network, the otherwise existing large bandwidth of optical fiber transmission network could be better utilized in this way.

For optical transmission networks for IP-based data traffic, as previously explained, typically, the entire time division-multiplexed signal, which is contained in an optical channel, is terminated at a node and split by means of a time division-multiplexing/demultiplexing unit into the individual sub-data streams or the individual sub-data streams are combined into the complete time division-multiplexed signal by means of the time division-multiplexing/demultiplexing unit. Thus, at a network node, either the full bandwidth of a complete time division-multiplexed signal is available, which is split by means of the downstream-connected DSLAM and a corresponding protocol or a corresponding protocol stack to the individual subscribers. Here, the DSLAM, considered in the OSI layer model, can take over the function of a layer 2 and/or layer 3 switch or router, so that the decision regarding which part of the IP traffic terminates at the node and which is assigned to certain end users or is passed through to a different node is made in the DSLAM (or also suitable equipment connected after the DSLAM).

In this way, the flexibility in the design of more complex transmission networks is limited, or relatively complicated network equipment (especially complex and thus expensive DSLAMs, switches, routers, etc.) is required.

SUMMARY OF THE INVENTION

The invention is based on the problem of creating a circuit structure for a transmission network node for transmitting high bit-rate, IP-based, time division-multiplexed signals, especially for an optical Multi-Gigabit Ethernet, which allows a flexible and cost-effective design of more complex optical transmission networks. In addition the invention is based on the problem of creating a channel card for an optical transmission system with such a structure and a structure of a network node for an optical wavelength division multiplexed transmission network, especially an optical Multi-Gigabit Ethernet.

The invention provides a solution in which, for an optical network for IP-based data streams, a significantly higher flexibility is achieved for the design of the network with a simultaneous reduction of the costs in the realization of the network node if the receive time division-multiplexed signal received on the east side and the west side of the node is broken down in the node by means of a framer unit into the individual multiplexed sub-signals, whose content is contained in each virtual time slot of the time division-multiplexed signal and which are provided to 2n internal ports of the framer unit. The individual sub-signals preferably each comprise a Gigabit Ethernet signal or a Multi-Gigabit Ethernet signal or the relevant content. The internal ports of the framer unit are each constructed as bidirectional ports, so that a corresponding signal, whose content is integrated by the framer unit into the assigned virtual time slot of the east-side or west-side transmit time division-multiplexed signal, can also be fed to these ports.

As a virtual time slot, in the scope of the present description, a portion of a frame structure of the high bit-rate receive or transmit time division-multiplexed signal is designated with a certain content. The "data contents" of a virtual time slot are designated as the content, independent of whether information or merely an idle signal is transported.

The circuit structure according to the invention further comprises a path-switch unit, which is connected on one side to the 2n internal ports of the framer unit and on the other side to at least one bidirectional local port. The path-switch unit can execute at least the following switching functions as a function of a control signal:

Bidirectional connection of one of the 2n internal ports with the one or more local ports (drop);

Unidirectional connection of the k-th internal port, to which is assigned the content of the k-th virtual time slot of the west-side receive signal, with the (k+n)-th internal port, such that the content of the k-th virtual time slot of the west-side receive signal is fed to the k-th virtual time slot of the east-side transmit signal (pass through from west to east), and/or Unidirectional connection of the k-th internal port, to which is assigned the content of the k-th virtual time slot of the east-side receive signal, with the (k+n)-th internal port, so that the content of the k-th virtual time slot of the east-side receive signal is fed to the k-th virtual time slot of the west-side transmit signal (pass through from east to west);

Unidirectional or bidirectional connection of the k-th of the 2n internal ports, to which is assigned the content of the k-th virtual time slot of the west-side receive signal, with the one or more local ports and simultaneous unidirectional connection of this k-th internal port with the (k+n)-th internal port, such that the content of the k-th virtual time slot of the west-side receive signal is fed to the k-th virtual time slot of the east-side transmit signal (drop a west-side virtual time slot & continue to the east);

Unidirectional or bidirectional connection of the k-th of the 2n internal ports, to which is assigned the content of the k-th virtual time slot of the east-side receive signal, with the one or more local ports and simultaneous unidirectional connection of this k-th internal port with the (k+n)-th internal port, such that the content of the k-th virtual time slot of the east-side receive signal is fed to the k-th virtual time slot of the west-side transmit signal (drop an east-side virtual time slot & continue to the west).

In this way, e.g., a certain virtual time slot comprising, for example, the content of a Gigabit or Multi-Gigabit Ethernet signal, can be terminated (dropped) or passed (pass-through) or simultaneously "terminated" and "passed" (drop & continue). In the case of an optical WDM network, this can be performed for each wavelength terminated in the node (i.e., each optical channel), wherein such a structure is provided for each terminated wavelength.

This circuit structure can be advantageously contained on a channel card for realizing a network node, which has only optical (bidirectional) ports and corresponding electronic converter units.

A flexible, configurable network node can be realized easily and cost-effectively with this circuit structure or such a channel card.

A transmit signal, which is fed to a local port of the circuit structure and which is fed to one of the internal ports via the path-switch unit, can have a different data rate and/or a different transmission protocol than those corresponding to the assigned virtual time slot of the east-side or west-side transmit signal to be generated and the framer unit can be constructed so that it converts the data rate and/or the protocol of the transmit signal fed to the local port into the data rate necessary for feeding the relevant content into the assigned virtual time slot of the transmit signal to be generated and/or the necessary protocol. This allows the further use of already existing network components and network structures, for example, the transmit signal fed to the local port can be an SDH (synchronous digital hierarchy), which can have a transmission rate of 155, 622, or 2488 Mbit/s, for example. If the data rate of the signal fed to the local port is greater than the data rate corresponding to the assigned virtual time slot, then the framer unit can split the contents of the signal fed to the local port onto several virtual time slots, and in this respect can break the strict assignment of the virtual time slot to a single local port. In the same way, the framer unit can be constructed so that it combines the contents of several virtual time slots into a signal and outputs this signal on an internal port.

Obviously, the splitting of the contents of a higher bit-rate signal can also be performed before the path-switch unit by means of a corresponding unit, wherein the relevant subsignals are then each fed to a local port.

According to one embodiment of the invention, at least two local ports are provided, which are connected to the path-switch unit, wherein the path-switch unit is constructed so that the previously mentioned switching functions can be executed with reference to each of the two or more local ports. In addition, the following switching function can be executed:

Bidirectional connection of the k-th internal port with a first of the two or more local ports and simultaneous bidirectional connection of a second of the two or more local ports with the (k+n)-th internal port, in order to allow sharing of the k-th virtual time slot by two or more nodes.

In this way, it is possible to transport the contents of several local transmit signals, which are each fed to a local port of different nodes, into the same virtual time slot, when the local transmit signals have correspondingly small data rates. In this way, the transmission capacity can be better used.

According to one embodiment of the invention, a number of local ports corresponding to the number n of virtual time slots can be provided, which are connected to the path-switch unit, wherein the path-switch unit is constructed, so that the switch functions according to feature (e) of Claim 1 can be executed with reference to each of the n local ports. In this way, a virtual slot of the east-side and the west-side receive and transmit time division-multiplexed signals can be assigned precisely to each of the n local ports.

In this way, a network node in a network with full path protection in terms of the entire time division-multiplexed signal or with protection in terms of the contents in one or more virtual time slots can be realized very easily.

The circuit structure can comprise an optoelectronic converter unit, which converts an optical receive time division-multiplexed signal into an electronic receive time division-multiplexed signal and an electronic transmit time division-multiplexed signal into an optical transmit time division-multiplexed signal, at the east-side and west-side remote port for realizing a network node for an optical network. Also, an optoelectronic converter unit, which converts an optical receive multiplexed signal into an electronic receive multiplexed signal and an electronic transmit multiplexed signal into an optical transmit multiplexed signal, can be provided on each local port.

Finally, the circuit structure can have a signal regenerator unit, which regenerates the receive time division-multiplexed signal, which is fed to the framer unit, or the receive signals, which are output to the internal ports of the framer unit, and/or which regenerates the transmit signals, which are fed to the internal ports of the framer unit, or the transmit time division-multiplexed signal, which is output by the framer unit.

In this way, among other things, the advantage is produced that for a pass-through of a virtual time slot (pass-through) or a drop & continue of a virtual time slot, a full signal regeneration is performed and thus the transmission route has low damping or a better signal-to-noise ratio (and, if relevant, low dispersion) than in the case of a purely optical node in a WDM system.

On a special embodiment of a channel card for an optical transmission system with such a circuit structure, at least one other pair of an east-side and west-side remote port can be provided, wherein another signal regenerator unit, which is used for the signal preparation of another receive time division-multiplexed signal that is fed to the east-side remote port and that is then fed to the west-side remote port and which is used for the signal preparation of another receive time division-multiplexed signal that is fed to the west-side remote port and that is then fed to the east-side remote port, is provided between each east-side and west-side remote port of the one or more other pairs of remote ports.

The signal regenerator unit can be integrated into the framer unit. In addition, the signal regenerator unit for the one or more other pairs of remote ports can be integrated with the signal regenerator unit for the first pair of remote ports.

With such a circuit structure or channel card, in a network node of an optical WDM system, in addition to the processing of the optical WDM signal, which is assigned to this node (i.e., whose contents are processed electronically by means of pure regeneration by means of the framer unit and the path-switch unit), another WDM channel can be regenerated completely (through electronic signal processing).

Additional embodiments of the invention are within the scope of the following description and claims. The example embodiments given illustrate the scope of the invention, but do not limit it.

The invention is explained in more detail below with reference to the embodiments shown in the drawing.

DETAILED DESCRIPTION

Figure 1:
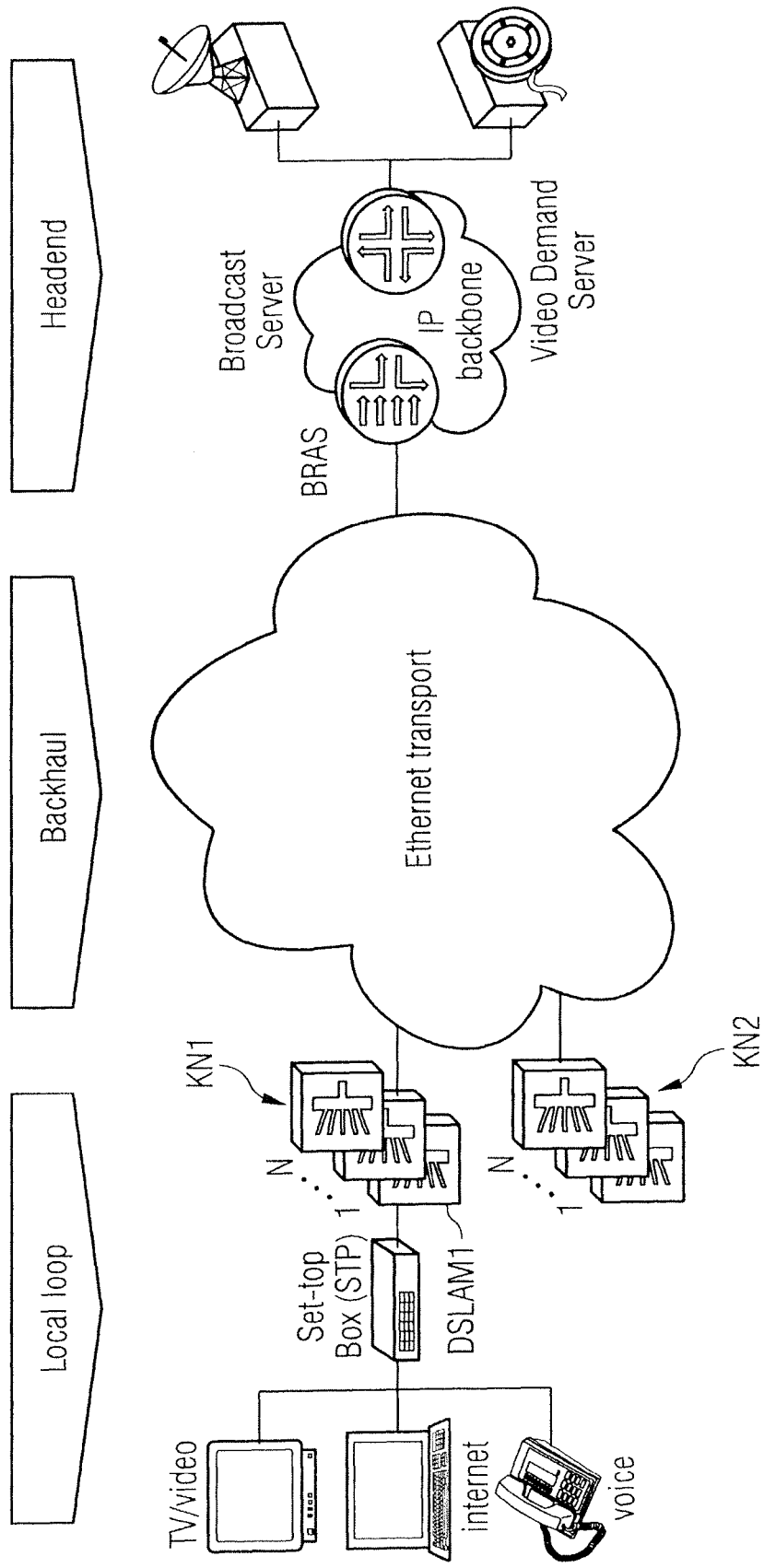
FIG. 1 is a schematic representation of the essential components for a transmission of broadcast and unicast data by a service provider via a transport network to the individual subscriber (downstream) and of unicast data from the individual subscriber to the service provider (upstream).
Figure 2:
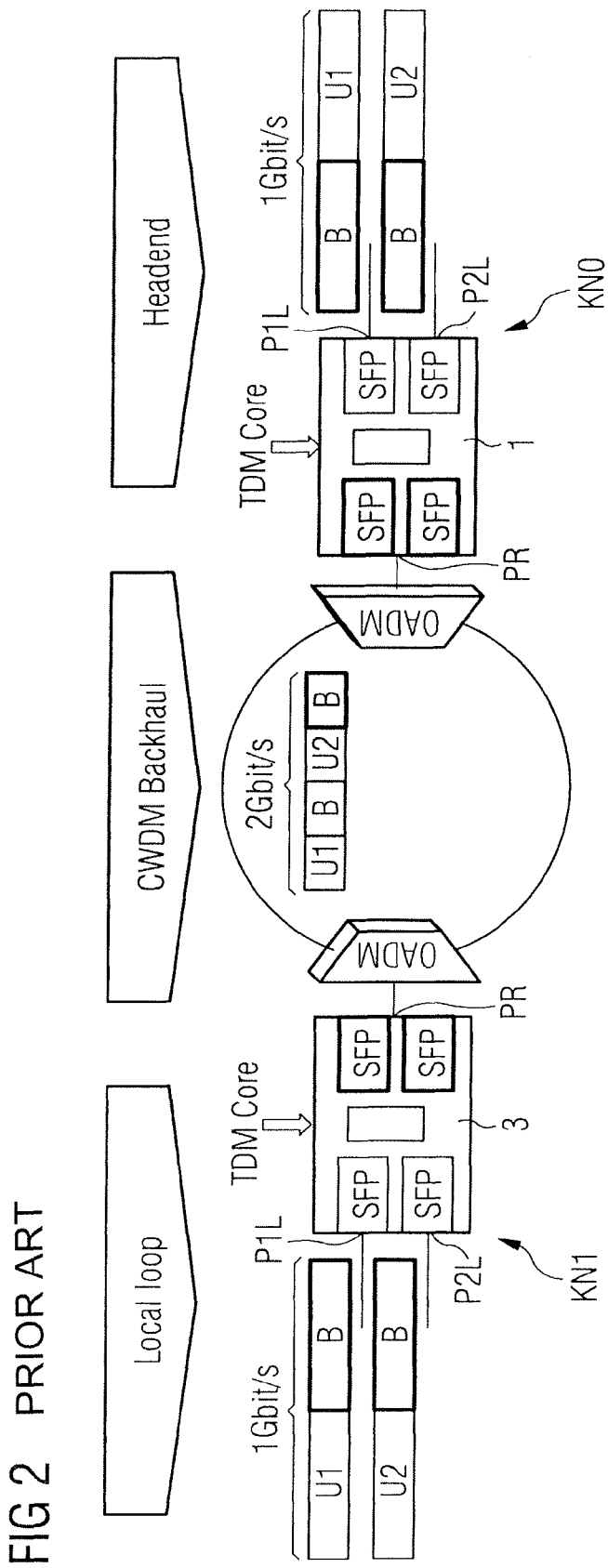
FIG. 2 is a schematic representation of the data transmission in time-division multiplexing between a service provider-side network node (head end) and a subscriber-side network node (local loop).
Figure 3:
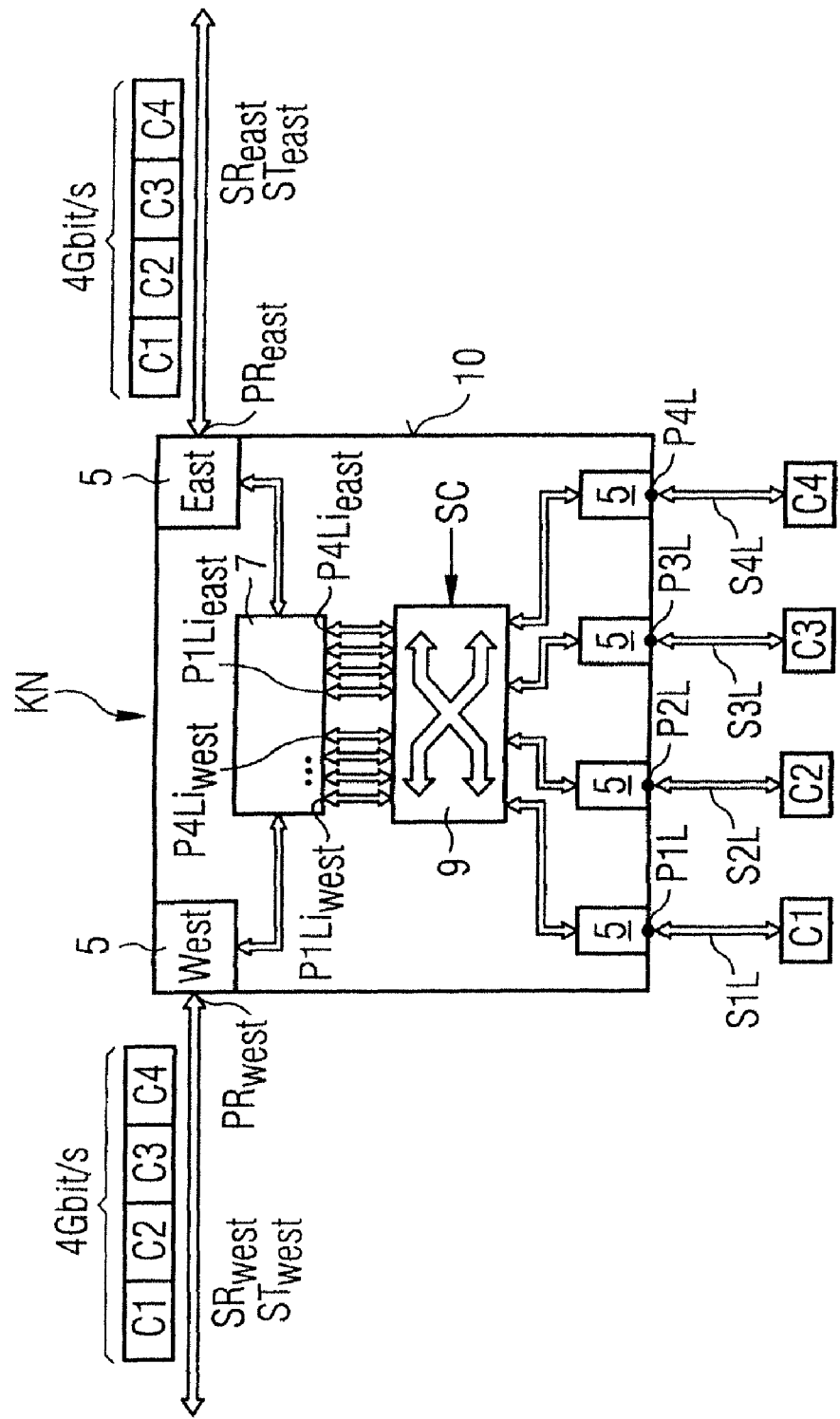
FIG. 3 is a schematic representation of the circuit structure of a channel card for realizing a network node in FIGS. 1 and 2.

In a schematic representation, FIG. 3 shows a circuit structure 10 for a network node KN for an existing network in connection with the network described in FIGS. 1 and 2. A receive time division-multiplexed signal $SR_{west}$, $SR_{east}$ is input to each network node KN on its east side and west side. Because each of the relevant west-side and east-side remote ports has a bidirectional construction, the circuit structure 10 shown in FIG. 3 can also output a transmit time division-multiplexed signal $ST_{west}$ and $ST_{east}$ for a network node KN on the west-side remote port and on the east-side remote port, respectively. In the embodiments shown in the figures, these time division-multiplexed signals, which contact the west-side or east-side remote port of the circuit structure 10, involve optical time division-multiplexed signals, which are each converted by an optoelectronic converter unit 5 into a corresponding electronic time division-multiplexed signal. For reasons of simplicity, the optical and electronic time division-multiplexed signals are designated by identical reference symbols.

The time division-multiplexed signal involves a time division-multiplexed signal with a given frame structure for transporting IP-based signals. Each time division-multiplexed signal comprises, as shown schematically in FIG. 3, several virtual time slots, in the shown embodiment four time slots, in each of which certain contents are transported, which are designated in FIG. 3 as C1 to C4.

The circuit structure 10 shown in FIG. 3 includes a framer unit 7, to which is fed the electronic east-side and west-side receive time division-multiplexed signal $SR_{west}$, $SR_{east}$. The framer unit 7 demultiplexes the receive time division-multiplexed signals $SR_{west}$, $SR_{east}$ and provides the contents C1 to C4 of the individual virtual time slots to bidirectional internal local ports $P1LI_{west}$ to $P4LI_{west}$ or $P1LI_{east}$ to $P4LI_{east}$. In the same way, signals with contents that are integrated by the framer unit 7 into the relevant east-side or west-side transmit time division-multiplexed signal $ST_{west}$ or $ST_{east}$, are fed to each of the internal local ports $P1LI_{west}$ to $P4LI_{west}$ or $P1LI_{east}$ to $P4LI_{east}$. This electronic transmit time division-multiplexed signal is then converted electro-optically, in turn, by means of the associated optoelectronic converter unit 5 into a corresponding optical transmit time division-multiplexed signal $ST_{west}$ or $ST_{east}$.

The time division-multiplexed signals preferably involve Multi-Gigabit Ethernet signals, which transport the contents of a Gigabit-Ethernet signal into each virtual time slot. Thus, in this case, Gigabit-Ethernet signals appear on the internal local ports $P1LI_{west}$ to $P4LI_{west}$ or $P1LI_{east}$ to $P4LI_{east}$.

The framer unit 7 can take over, in addition to the pure multiplexing function, the task of converting its input signals, especially signals fed to a local port P1L to P4L and thus also to the associated internal local ports $P1LI_{west}$ to $P4LI_{west}$ or $P1LI_{east}$ to $P4LI_{east}$, in terms of the data rate and protocol, so that the relevant contents can be integrated into the frame structure of each west-side or east-side transmit time division-multiplexed signal. In this way, it is possible to supply a transmit signal ST1L to ST4L, which has a lower or higher data rate than would be necessary for full occupancy of each virtual time slot with contents, to one or more of the local ports P1L to P4L or also to provide a corresponding conversion for the receive signals SR1L to SR4L output to these ports. In the drawing, the reference symbols S1L to S4L each designate a pair of transmit and receive signals.

For example, one or more transmit signals ST1L to ST4L fed to a local port P1L to P4L may involve SDH (synchronous digital hierarchy) signals, that have a lower bit rate than would be necessary for full occupancy of a virtual time slot of the transmit time division-multiplexed signal $ST_{west}$ or $ST_{east}$. In this case, the framer unit 7 can integrate the full contents C1 to C4 of the local transmit signals ST1L to ST4L into each associated virtual time slot of the relevant transmit time division-multiplexed signals $ST_{west}$ or $ST_{east}$. If the data rate of the local transmit signals ST1L to ST4L is higher than the rate that would correspond to full occupancy of a virtual time slot of the transmit time division-multiplexed signal $ST_{west}$, $ST_{east}$, then the framer unit 7 can distribute the relevant contents into two or more of the virtual time slots. Generating the local receive signals SR1L to SR4L can be performed in the reverse way.

This flexibility allows equipment of an already existing network, which works with other transmission rates or protocols, to be used further with the circuit structure 10 according to FIG. 3 and to integrate it into the new or expanded transmission network.

As already indicated briefly, the circuit structure 10 shown in FIG. 3 comprises the four local ports P1L to P4L, wherein a local transmit signal ST1L to ST4L with corresponding contents are fed to each port and a local receive signal SR1L to SR4L with corresponding contents can be output by each port.

The circuit structure 10 may have an optoelectronic converter unit 5, which is used for the optoelectronic or electro-optical conversion of the local transmit or receive signals S1L to S4L, on each of the local ports P1L to P4L. For reasons of simplicity, in the scope of the present description, the corresponding optical or electronic signals are designated by identical reference symbols.

In addition, the circuit structure 10 has a path-switch unit 9, which is connected via the optoelectronic converter units 5 to the local ports P1L to P4L and the internal local ports $P1LI_{west}$ to $P4LI_{west}$ and $P1LI_{east}$ to $P4LI_{east}$. The path-switch unit 9 is controlled by means of a configuration signal SC. The path-switch unit 9 allows the following switch positions to be assumed, in which two or more of the ports P1L to P4L, $P1LI_{west}$ to $P4LI_{west}$ and $P1LI_{east}$ to $P4LI_{east}$ are interconnected, as a function of the configuration signal SC. Thus, the path-switch unit can be understood as a cross connect with selected switching possibilities.

The path-switch unit 9 here allows, as a function of the configuration signal SC, the following functions of the switch structure 10:

If a virtual time slot of the east-side or west-side receive time division-multiplexed signal $SR_{east}$, $SR_{west}$ is to be terminated in the node KN (completely), then the path-switch unit 9 connects the associated internal local port $P1LI_{west}$ to $P4LI_{west}$ or $P1LI_{east}$ to $P4LI_{east}$ to the desired local port P1L to P4L.

It is assumed that the embodiment shown in FIG. 3 involves a network with protection. That is, for certain reasons, for example, due to a break in the optical waveguide on the east side or west side, if it is not possible to receive a signal from the relevant side or to transmit a signal via this side to another node, then the circuit structure 10 feeds the same receive time division-multiplexed signal to the other side. Thus, either the relevant west-side or the relevant east-side internal local port is connected to the desired local port. In the same way, the circuit structure 10 can communicate with the desired receiver through the transmission of a transmit time division-multiplexed signal on this "protection" side. This is indicated in FIG. 3 in that the time division-multiplexed signals, which are transported on the east side or the west side, are occupied by the same contents C1 to C4. If no protection is required, then these signals can obviously also transport different contents. In this case, the circuit structure also has twice the number of local ports, if, in certain switching functions of the path-switch unit 9, it should be desired that all of the virtual time slots of the east-side and the west-side time division-multiplexed signal are terminated in the node KN or that exactly one local port should be assigned to each virtual time slot when this is terminated in the node.

In principle, it is not necessary to perform a fixed assignment of a local port to one or more virtual time slots of the east-side and/or west-side time division-multiplexed signal, but this can simplify the handling of equipment with such a circuit structure. Therefore, in the embodiment shown in FIG. 3, under consideration of the protection, not only is the number of local ports P1L to P4L selected to be equal to the number of virtual time slots of the east-side or west-side time division-multiplexed signal, but a fixed assignment of the time slots to the relevant local port is also performed. That is, if a virtual time slot is to be terminated in the node KN, the path-switch unit 9 switches through the internal local port $P1LI_{west}$ or $P1LI_{east}$ to the local port P1L, the internal local port $P2LI_{west}$ or the local port $P2LI_{east}$ to the local port P2L, etc. Thus, the contents C1 of the first virtual time slot are output on the first local port P1L, the contents C2 of the second virtual time slot are output on the second local port P2L, etc.

If the circuit structure 10 is contained, for example, on a channel card for realizing a node in an optical WDM network, then simple handling of the channel card is produced for the wiring of the local port P1L to P4L.

These comments also apply, if meaningful, to the other functions

In addition to the previously described drop function, in which a certain virtual time slot of the east-side and/or west-side time division-multiplexed signal is terminated in node KN (completely), the circuit structure 10 can also realize a pass-through function, in which a virtual time slot of a receive time division-multiplexed signal $SR_{west}$, $SR_{east}$ is assigned to the corresponding virtual time slot of the transmit time division-multiplexed signal on the other side $ST_{east}$, $ST_{west}$. For this purpose, the path-switch unit 9 must connect the internal local ports $P1LI_{west}$ to $P4LI_{west}$ to the associated internal local ports $P1LI_{east}$ to $P4LI_{east}$, as a function of a corresponding configuration signal SC. Because all of the ports preferably have a bidirectional configuration, a completely transparent pass-through of a virtual time slot from east to west or from west to east is guaranteed.

The framer unit 7 can include a unit for signal regeneration (not shown). This produces the advantage that the electronic receive time division-multiplexed signal, which is fed to the east side or west side of the circuit structure 10, is further propagated, especially with respect to the clock and the signal form. Negative effects of the signal due to attenuation, dispersion, or noise effects of the transmission route can be equalized in this way. This has an especially advantageous effect in the realization of the pass-through function, because negative effects of the prior transmission route can be compensated by the signal regeneration. If the signal is passed through several nodes KN1 to KNN, then, for signal regeneration in each node, the signal-to-noise ratio does not become worse, as would be the case, for example, for purely optical amplification in the node.

As another important function for a node KN, by means of the switch structure 10, the drop & continue function can also be realized, which is used, for example, for the transmission of broadcast signals contained in a virtual time slot. For this functionality, the relevant virtual time slot is both terminated in the node KN and also simultaneously passed through (at least the broadcast contents). For this purpose, the path-switch unit 9 is controlled by means of the configuration signal SC, so that on one side the relevant west-side or east-side internal local port $P1LI_{west}$ or $P1LI_{east}$ is connected to the desired local port P1L to P4L, and simultaneously the relevant internal local port $P1LI_{west}$ to $P4LI_{west}$ or $P1LI_{east}$ to $P4LI_{east}$ is connected to the assigned port of the other side $P1LI_{east}$ to $P4LI_{east}$ or $P1LI_{west}$ to $P4LI_{west}$. For this switching function, either a pass-through of the signal (continue portion of the drop & continue function) from east to west or a pass-through of the signal from west to east can be performed. Obviously, both functions, that is, drop & continue from east to west and drop & continue from west to east, can also be performed simultaneously, if so desired.

If it involves a network with protection and if the time division-multiplexed signals transport different contents from east to west and from west to east, then the drop & continue function can also be used simultaneously in the direction from east to west and in the direction from west to east. In this case, the virtual time slot of the east-side receive time division-multiplexed signal and the corresponding virtual time slot of the west-side receive time division-multiplexed signal must each be terminated on a different local port.

In addition to these basic functions of a network node, the circuit structure 10 according to FIG. 3 can also additionally allow sharing of a virtual time slot in different nodes, which are each realized using a circuit structure 10 according to FIG. 3. For this purpose, the path-switch unit 9 is controlled so that each internal port $P1LI_{west}$ to $P4LI_{west}$ or $P1LI_{east}$ to $P4LI_{east}$ is connected to a first port of the local ports P1L to P4L and a second port of the local ports P1L to P4L is connected to the corresponding internal local port $P1LI_{east}$ to $P4LI_{east}$ or $P1LI_{west}$ to $P4LI_{west}$, to which is assigned the same virtual time slot of the time division-multiplexed signal on the other side.

In this way it is possible that another local unit, for example, a switch or an end device, which is connected to the first or second local port, "terminates" only a portion of the contents of the relevant virtual time slot and propagates the other portion of the contents through the (external) pass through of this signal via the second port of the circuit structure 10 to another network node KN, which then evaluates the other portion of the contents of this virtual time slot. The management of which contents of the virtual time slot are "terminated" in which node can be implemented by other units, so that the circuit structure 10 behaves transparently in this respect. Obviously, according to this principle, more than two nodes can also share the contents of one virtual time slot.

Various possibilities for realizing a transmission network or a sub-transmission network using the circuit structure according to FIG. 3 are described below with reference to FIGS. 4 to 8.

Figure 4:
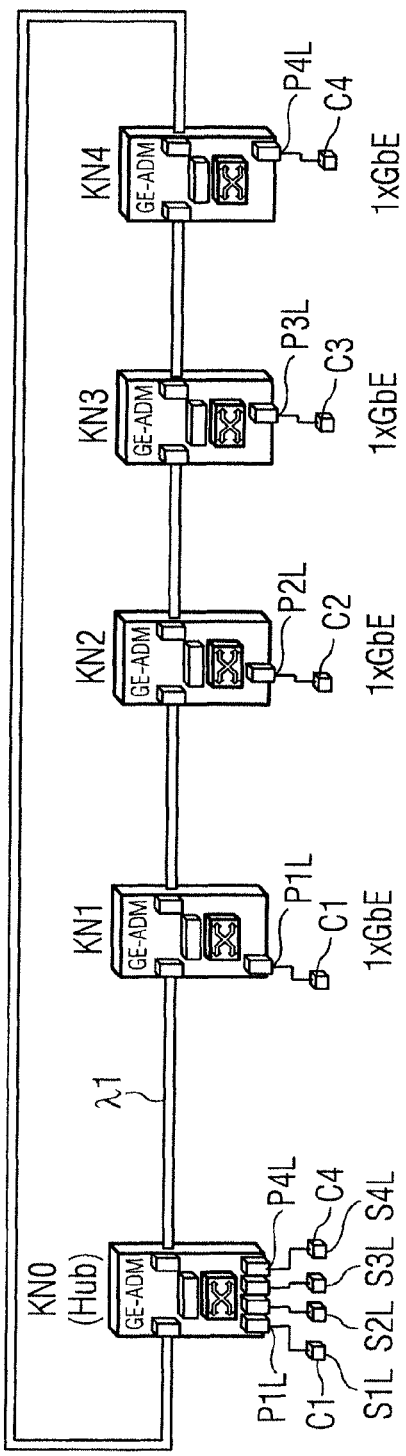
FIG. 4 is a schematic representation of an optical transmission network with a ring structure with four local loop-side network nodes and a head end-side network node, wherein a virtual time slot of the time division-multiplexed signal is terminated in each local loop-side network node.

FIG. 4 shows a ring-shaped transmission network with four network nodes KN1 to KN4, as well as a hub, which is also designated as KN0, and realizes the functionality of a head end according to FIG. 1. The signal transmission is performed on optical paths, wherein in the embodiment shown in FIG. 4, only one single optical wavelength or optical intermediate wavelength is used. By means of the node KN0, the signals S1L to S4L are fed into the network or, for bidirectional data traffic, decoupled from the network. The local receive and transmit signals SR1L to SR4L and ST1L to ST4L, respectively, in the node KN0 or their contents are each assigned to a virtual time slot of the time division-multiplexed signals guided in the ring. Obviously, one or more of the virtual time slots might not be necessary to transport the corresponding contents to or from the local ports P1L to P4L of the node KN0. In this case, the corresponding local ports of the circuit structure in the node KN0 can be left out or remain open. The unoccupied virtual time slots can then be used for transporting data between the other nodes KN1 to KN4 in the ring.

For the total structure of a ring-shaped network shown in FIG. 4, however, it is assumed that all of the available, that is, all four of the virtual time slots, are each assigned to one of the local ports P1L to P4L of the node KN0, that is, the hub. In the shown embodiment, a virtual time slot is terminated at each of the other nodes KN1 to KN4. According to the circuit structure shown in FIG. 3, in which a local port P1L to P4L is assigned to a virtual time slot, in FIG. 4 in each of the nodes KN1 to KN4 only the local port P1L to P4L is shown, to which the signal with the contents C1 to C4 of the corresponding virtual time slot is applied. In this way, in the representation of the nodes KN1 to KN4, the representation of the other local ports is eliminated.

As shown in FIG. 4, in the ring of the network the time division-multiplexed signal can comprise four virtual time slots, which in each case the contents of a Gigabit-Ethernet signal (GbE) are transported. Thus, a four Gigabit-Ethernet signal is transmitted in the ring.

Obviously, this structure can also be expanded to the transport of an n-Gigabit-Ethernet signal with a number of n nodes (in addition to the hub).

In the embodiment according to FIG. 4, each channel card 13 must execute the "drop" function with reference to each virtual time slot to be terminated and the "pass through" function with reference to each other virtual time slot, i.e., the relevant internal local ports $P1LI_{west}$ to $P4LI_{west}$ or $P1LI_{east}$ to $P4LI_{east}$ and the local ports P1L to P4L must be connected accordingly through suitable control of the path-switch unit.

Figure 5:
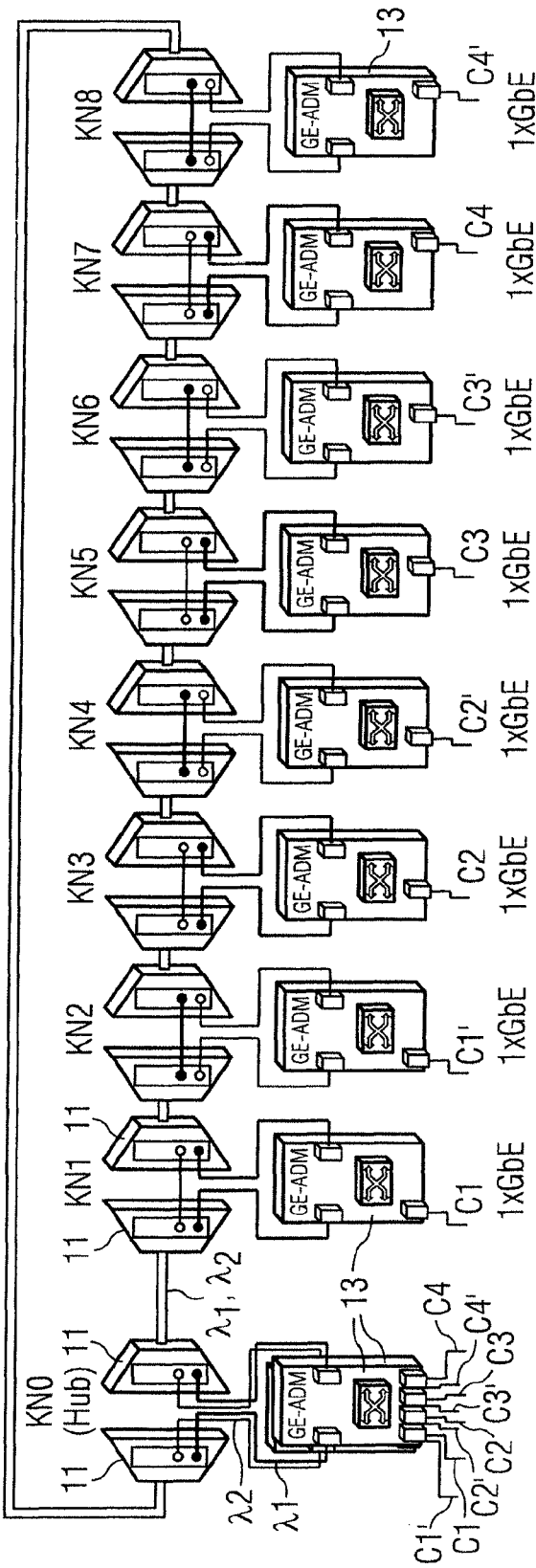
FIG. 5 is a schematic representation of an optical WDM transmission network analogous to FIG. 4, but with two wavelengths and eight local loop-side network nodes, wherein a virtual time slot of each of the two time division-multiplexed signals is terminated in each local loop-side network node.

The structure shown in FIG. 5 for a transmission network relates to a ring-shaped WDM transmission network with two channels, that is, with two optical intermediate wavelengths $\lambda_1$, $\lambda_2$. Each of these optical channels transports a time division-multiplexed signal with four virtual time slots in the shown embodiment. The optical time division-multiplexed signals can be identical in both transmission directions of the ring, so that protection is thereby realized. The optical time division-multiplexed signals are fed to or output from the ring via the hub or the node KN0 via an optical multiplexer/demultiplexer unit 11. Each of the signals is generated by a channel card 13, which comprises a structure according to FIG. 3. Each channel card combines the signals on four local ports into one time division-multiplexed signal or demultiplexes a receive time division-multiplexed signal to the relevant local ports. Because this also involves an optical transmission system, each channel card, as shown in FIG. 3, includes an optoelectronic converter 5 for electro-optical or optoelectronic conversion of the electronic or optical time division-multiplexed signals.

As shown in FIG. 5, a virtual time slot of the first optical channel or second optical channel is terminated alternately in successive network nodes KN1 to KN8 in the transmission direction. Each time division-multiplexed signal, in turn, comprises four virtual time slots, in which the contents of each Gigabit-Ethernet signal can be transported, that is, each time division-multiplexed signal represents a four Gigabit-Ethernet signal.

The alternating termination of each time slot from the first or second optical channel ensures that, due to the presence of a regenerator unit on each channel card of the nodes KN1 to KN8, which, in turn, comprise the structure according to FIG. 3, signal regeneration is performed in every second node. The signal of each other optical channel, from which in the relevant node no virtual time slot is terminated, is passed through in the relevant network node over optical paths. Here, at best optical amplification can still be performed, whereby, however, the original signal-to-noise ratio of the optical signal coupled in the node KN0 cannot be recreated.

As in FIG. 4, in the transmission network shown in FIG. 5, in each node only the local port is shown, which is assigned to each terminated virtual time slot of the relevant optical signal.

Figure 6:
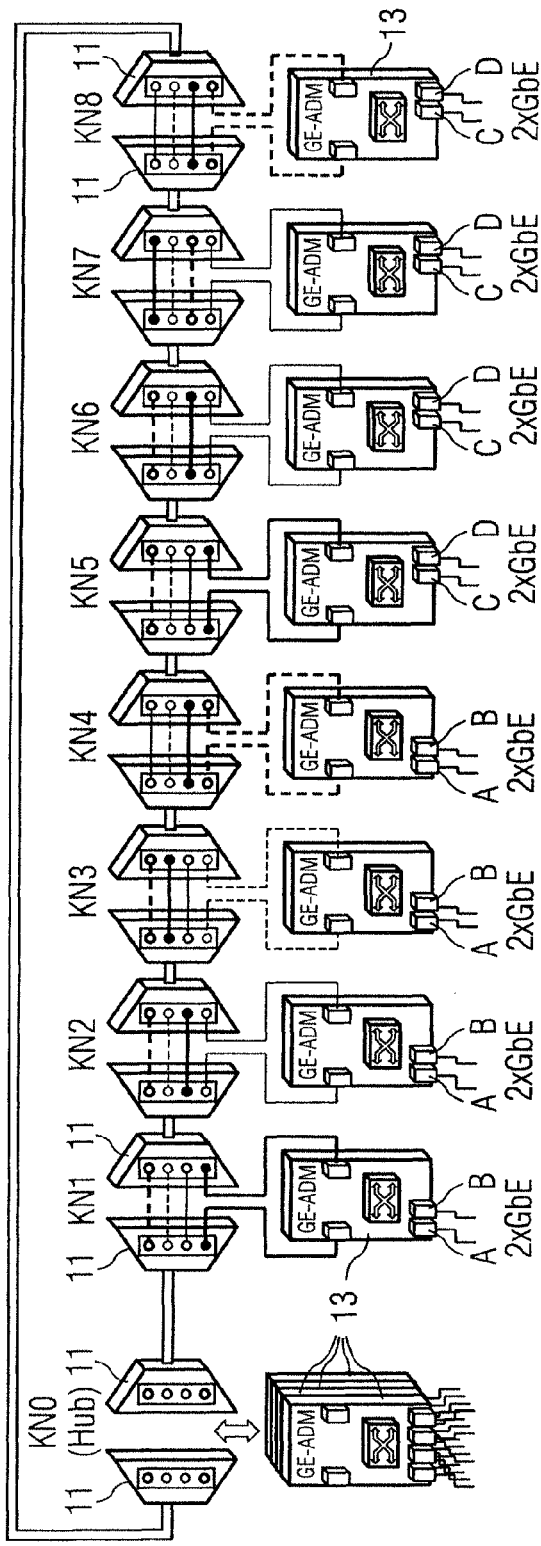
FIG. 6 is a schematic representation of an optical WDM transmission network analogous to FIG. 5, but with four wavelengths, wherein two virtual time slots of each of the two time division-multiplexed signals are terminated in each local loop-side network node.

FIG. 6 shows an embodiment of a ring-shaped optical transmission network, which essentially corresponds to the embodiment according to FIG. 5. However, in this embodiment, four optical channels, each with four virtual time slots, are coupled into the transmission ring by means of four channel cards 13, each of which has the structure according to FIG.

3. For this purpose, in turn, an optical multiplexer/demultiplexer unit 11 is used for each transmission direction. Each optical channel is decoupled at each of the network nodes KN1 to KN8, likewise by means of a corresponding optical multiplexer/demultiplexer 11. In the shown embodiment, two virtual time slots are terminated in each of the nodes, so that two local ports are occupied, which guide the corresponding local receive-and-transmit signals. Because four time division-multiplexed signals, which each comprise four virtual time slots for the transport of the contents of a Gigabit-Ethernet signal, are coupled or decoupled in the node KN0, in each node two Gigabit-Ethernet signals are provided. To achieve an optimum signal-to-noise ratio in the ring, in each of the first four nodes, one of the optical channels is decoupled and two virtual time slots of the relevant optical channel are terminated in each node. In the second four nodes, in the same sequence as in the first four nodes, in turn, an optical channel is likewise decoupled and the two other virtual time slots are terminated.

Figure 7:
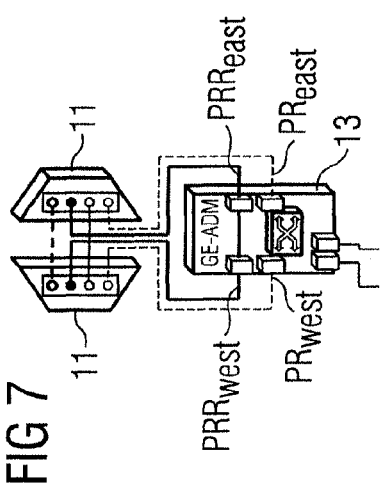
FIG. 7 is a schematic representation of the structure of a network node with a channel card, which can also regenerate the time division-multiplexed signals of another optical channel.

FIG. 7 shows another embodiment of a channel card 13, with which a network node can be realized in connection with an optical multiplexer/demultiplexer unit 11 for each transmission direction of an optical network. This channel card 13 comprises an additional pair of optical regeneration remote ports $PRR_{west}$ or $PRR_{east}$, which are each connected to another output of the optical multiplexer/demultiplexer unit. In this way, a second optical channel can be decoupled in the relevant node and fed to the channel card 13. However, with reference to the ports $PRR_{west}$ or $PRR_{east}$, the channel card 13 executes only one optoelectronic conversion or electro-optical conversion with intermediate signal regeneration. For this purpose, an additional signal regenerator unit can be provided, or the regeneration function is performed with reference to these additional time division-multiplexed signals by the already present signal regenerator unit, which can be integrated, for example, in the framer unit.

If the structure shown in FIG. 6 is realized with such a channel card 13, then in each node both the time division-multiplexed signal of the completely passed channel is regenerated and also the time division-multiplexed signal corresponding to the optical channel, of which two virtual time slots are terminated in the relevant node, by means of the relevant channel card 13.

Obviously, such a channel card can also be expanded by several pairs of additional remote ports, with which the full regeneration of an optical channel (in both transmission directions) is possible.

Figure 8:
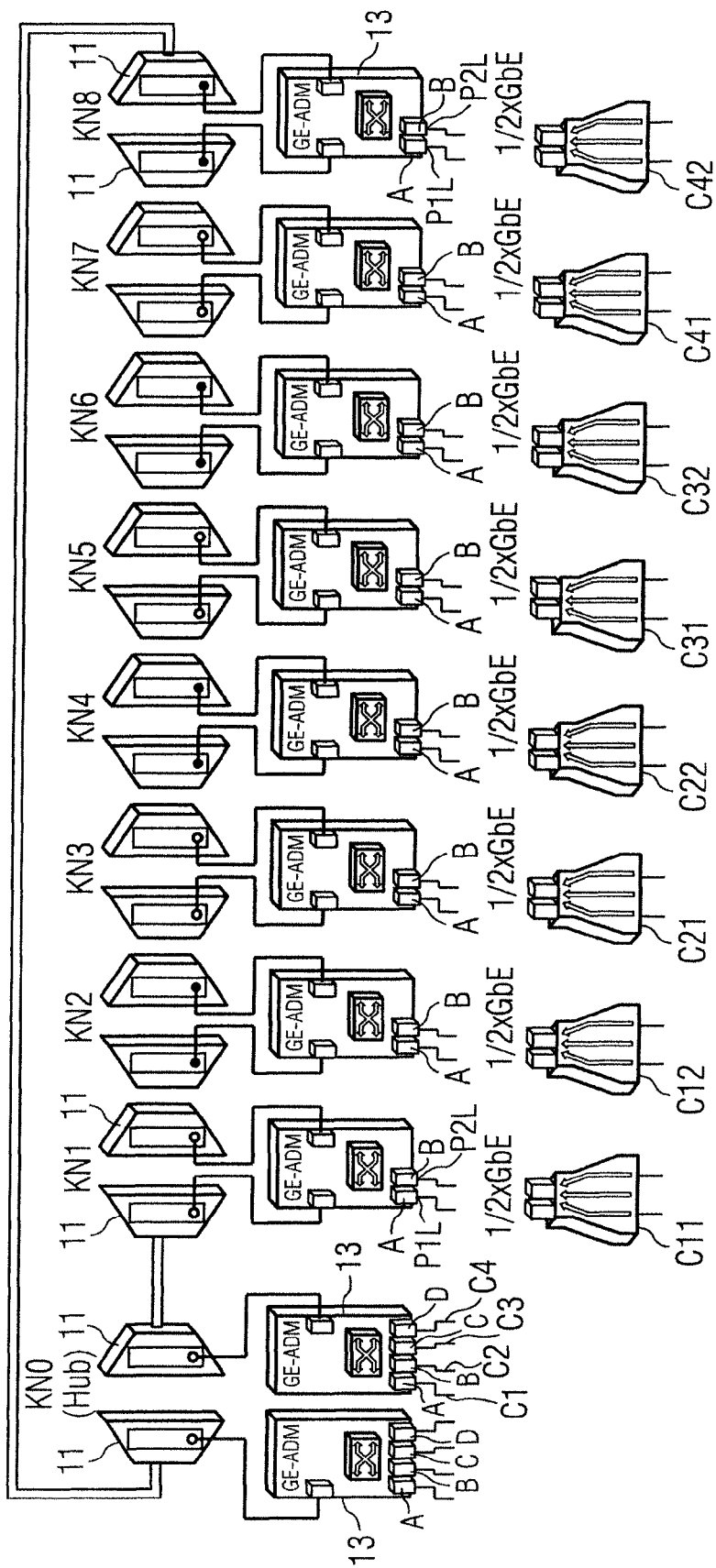
FIG. 8 is a schematic representation of an optical transmission network analogous to FIG. 5, but only with one wavelength, wherein every two local loop-side network nodes share a virtual time slot.

FIG. 8 shows, in turn, a ring-shaped optical transmission network with a hub or node KN0 and eight other nodes KN1 to KN8. In the hub, an optical transmit time division-multiplexed signal with a certain intermediate wavelength is coupled into the transmission ring or a receive time division-multiplexed signal is decoupled from the ring by means of two channel cards 13 each for the normal transmission direction and the protection transmission direction via an optical multiplexer/demultiplexer unit 11. Here, the function of these two channel cards 13 can obviously be combined into one channel card, as also happens in the structure in FIG. 3.

The other nodes KN1 to KN8 are realized in the shown embodiment each with a channel card 13 and a pair of optical multiplexer/demultiplexer units 11. In the present embodiment, however, because only one optical channel is used in the shown expansion stage, the optical multiplexer/demultiplexer units 11 could also be eliminated and the optical signal could be connected directly to the remote ports of the channel cards.

In each of the nodes KN1 to KN8, only partial contents C1 to C4 of a virtual optical time slot are terminated. For this purpose, as described above, the relevant channel card is switched into the "sharing" mode with reference to each local port P1L, P2L. Here, the local signal with the contents C1 to C4 made available on the first local port P1L is passed through via a unit connected in series with the port P1L and P2L, for example, via a DSLAM, to the second local port P2L or vice versa. Here, the other unit uses only a portion assigned to it of the supplied contents C1 of the local signal corresponding to the first virtual time slot. The other portion is evaluated by the additional "pass-through" of the signal via the external additional unit in a different network node. This can be, for example, the network node that is directly next in the transmission direction, as shown schematically in FIG. 8. The first part of the content C1 is here designated as $C1_1$ and the second part of the content is designated as $C1_2$. In this way, in each of the nodes KN1 to KN8, only the transmission capacity of a half Gigabit-Ethernet signal can be provided. Obviously, however, the splitting of the contents can also be performed asymmetrically. In the same way, sharing of the virtual time slot can be performed not only by two, but also by several nodes.

Through the principle of sharing virtual time slots, a significantly greater flexibility is achieved in the design and in the realization of an optical transmission network.

The path-switch unit 7 in the embodiments according to FIGS. 5, 6, and 8 is controlled analogously to the above explanations in connection with FIG. 4.

It should be noted that, obviously, the functions described above as "drop," "pass-through," "drop & continue," and "time slot sharing" can be combined in a network in any way as a function of the desired functionality.

The invention claimed is:

1. A circuit structure for use in a transmission network node for transmitting high bit-rate, time division-multiplexed signals, the circuit structure comprising:
   (a) a bidirectional west-side and a bidirectional east-side remote port, the west-side remote port configured to receive a west-side receive time division-multiplexed signal and configured to transmit a west-side transmit time division-multiplexed signal, and the east-side remote port configured to receive an east-side receive time division-multiplexed signal and configured to transmit an east-side transmit time division-multiplexed signal, wherein each time division-multiplexed signal has a frame structure with a number n of virtual time slots, in each of which certain contents are transported;
   (b) a framer unit, to which is fed the west-side and the east-side receive time division-multiplexed signal and which has a number 2n of bidirectional internal ports at which the framer unit is configured to output a receive signal comprising the contents of a respective assigned virtual time slot(s) of at least one of the west-side and the east-side receive time division-multiplexed signal, and on which bidirectional internal ports a respective transmit signal can be fed to the framer unit, wherein the framer unit is configured to feed the contents of the respective transmit signal to the respective assigned virtual time slot(s) for generating the relevant west-side or east-side transmit signal; and
   (c) a path-switch unit connected on one side to the 2n internal ports of the framer unit and on the other side to at least one bidirectional local port, wherein the path-switch unit can execute at least the following switching functions as a function of a control signal:

(i) bidirectional connection of one of the 2n internal ports with the one or more local ports;

(ii) unidirectional connection of the k-th internal port, to which are assigned the contents of the k-th virtual time slot of the west-side receive signal, with the (k+n)-th internal port, such that the contents of the k-th virtual time slot of the west-side receive signal are fed to the k-th virtual time slot of the east-side transmit signal, and/or (iii) unidirectional connection of the k-th internal port, to which are assigned the contents of the k-th virtual time slot of the east-side receive signal, with the (k+n)-th internal port, such that the contents of the k-th virtual time slot of the east-side receive signal are fed to the k-th virtual time slot of the west-side transmit signal;

(iv) unidirectional or bidirectional connection of the k-th of the 2n internal ports, to which are assigned the contents of the k-th virtual time slot of the west-side receive signal, with the one or more local ports and simultaneous unidirectional connection of this k-th internal port with the (k+n)-th internal port, such that the contents of the k-th virtual time slot of the west-side receive signal are fed to the k-th virtual time slot of the east-side transmit signal; and (v) unidirectional or bidirectional connection of the k-th of the 2n internal ports, to which are assigned the contents of the k-th virtual time slot of the east-side receive signal, with the one or more local ports and simultaneous unidirectional connection of this k-th internal port with the (k+n)-th internal port, such that the contents of the k-th virtual time slot of the east-side receive signal are fed to the k-th virtual time slot of the west-side transmit signal.

2. The circuit structure of claim 1, wherein the contents of a Gigabit-Ethernet signal or a Multi-Gigabit-Ethernet signal are transported in each of the n virtual time slots.

3. The circuit structure of claim 1, wherein a transmit signal, which is fed to the one or more local ports and which is fed via the path-switch unit to one of the internal ports, has a different data rate and/or a different transmission protocol than those corresponding to the assigned virtual time slot of the east-side or west-side transmit signal to be generated, and wherein the framer unit is constructed so that it converts the data rate and/or the protocol of the transmit signal fed to the local port into the data rate necessary for supplying the relevant contents into the assigned virtual time slot of the transmit signal to be generated and/or the required protocol.

4. The circuit structure of claim 1, further comprising two or more local ports connected to the path-switch unit, and wherein the path-switch unit is constructed so that the switching functions can be executed according to feature (c) of claim 16 with reference to each of the two or more local ports.

5. The circuit structure of claim 4, wherein the path-switch unit is constructed so that it can also execute the following switching functions, bidirectional connection of the k-th internal port with a first of the at least two local ports and simultaneous bidirectional connection of a second of the at least two local ports with the (k+n)-th internal port, in order to allow sharing of the k-th virtual time slot by two or more nodes.

6. The circuit structure of claim 1, wherein a number of local ports is provided, which correspond to the number n of virtual time slots and which are connected to the path-switch unit, and in that the path-switch unit is constructed so that the switching functions according to feature (c) of claim 16 can be executed with reference to each of the n local ports.

7. The circuit structure of claim 6, wherein exactly one virtual slot of the east-side and the west-side receive and transmit time division-multiplexed signals is assigned to each of the n local ports.

8. The circuit structure of claim 1, further comprising an optoelectronical converter unit on the east-side and west-side remote port, which is configured to convert an optical receive time division-multiplexed signal into an electronic receive time division-multiplexed signal, and convert an electronic transmit time division-multiplexed signal into an optical transmit time division-multiplexed signal.

9. The circuit structure of claim 1, characterized in that on each local port there is an optoelectronical converter unit, which is configured to convert an optical receive multiplexed signal into an electronic receive multiplexed signal, and convert an electronic transmit multiplexed signal into an optical transmit multiplexed signal.

10. The circuit structure of claim 1, further comprising a signal regenerator unit configured to regenerate the receive time division-multiplexed signal fed to the framer unit or the receive signals output to the internal ports of the framer unit and/or regenerate the transmit signals fed to internal ports of the framer unit or the transmit time division-multiplexed signal output by the framer unit.

11. A channel card for an optical transmission system with a circuit structure according to claim 1, wherein all of the necessary components are provided on the channel card.

12. The channel card of claim 11, wherein at least one other pair of an east-side and west-side remote port is provided, and wherein between each east-side and west-side remote port of at least one other pair of remote ports there is another signal regenerator unit, which is configured for the signal preparation of another receive time division-multiplexed signal that is fed to east-side remote port and that is then fed to the west-side remote port and which is used for the signal preparation of another receive time division-multiplexed signal that is fed to the west-side remote port and that is then fed to the east-side remote port.

13. The channel card of claim 12, wherein the other signal regenerator unit for at least one other pair of an east-side and west-side remote port is integrated with the existing signal regenerator unit to form a single signal regenerator unit.

14. The channel card of claim 12, characterized in that on each east-side and west-side remote port of at least one other pair of an east-side and west-side remote port there is an optoelectronical converter unit for optoelectronical conversion of the relevant optical receive time division-multiplexed signal and for the electro-optical conversion of the relevant electronic transmit time division-multiplexed signal.

15. The channel card of claim 14, wherein the other signal regenerator unit for at least one other pair of an east-side and west-side remote port is integrated with the existing signal regenerator unit to form a single signal regenerator unit.

16. A network node including the circuit structure of claim 1, the node for use in an optical wavelength division multiplexed transmission network in which optical wavelength division-multiplexed signals with a number m of optical channels are transmitted between the nodes in both transmission directions, wherein the optical wavelength division-multiplexed signals contains, in each optical channel with the intermediate wavelength $\lambda_j$ (j=1 . . . m), an optical time division-multiplexed signal, which has a frame structure with a number of n virtual time slots for transporting data, the network node comprising:

(a) an optical add/drop multiplexer (OADM), having east-side and west side remote ports configured for input/output of optical wavelength division-multiplexed signals, the OADM having at least one east-side and west-side local port, the OADM configured to decouples an optical channel each with a certain intermediate wavelength from the east-side and west-side optical wavelength division-multiplexed signal and output the optical channel on a selected relevant east-side or west-side local port, and wherein the OADM is configured to integrate a second optical channel fed on the east-side or west-side local port with a certain intermediate wavelength into a selected relevant optical east-side or west-side wavelength division-multiplexed signal; and (b) an instance of the circuit structure of claim 16, the OADM west-side local port connected to the west-side remote port of the circuit structure, if necessary with the intermediate connection of an optical converter unit, and the OADM east-side local port connected to the east-side remote port of the circuit structure, if necessary, with the intermediate connection of an optical converter unit.

\* \* \* \* \*

UNITED STATES PATENT AND TRADEMARK OFFICE
CERTIFICATE OF CORRECTION

PATENT NO.        : 7,764,883 B2                                             Page 1 of 1
APPLICATION NO.   : 11/762629
DATED             : July 27, 2010
INVENTOR(S)       : Henning Hinderthur It is certified that error appears in the above-identified patent and that said Letters Patent is hereby corrected as shown below:

At column 15, line 54: change "claim 16" to read --claim 1--.

At column 16, line 1: change "claim 16" to read --claim 1--.

Signed and Sealed this

Ninth Day of November, 2010

David J. Kappos
*Director of the United States Patent and Trademark Office*